United States Patent [19]

Bohler et al.

[11] Patent Number: 4,732,294

[45] Date of Patent: Mar. 22, 1988

[54] SAFETY LATCH MEANS FOR FILTER ASSEMBLY

[75] Inventors: James R. Bohler, Danville; Jerry E. Stephenson, Lebanon; Thomas E. Drawbaugh, Fillmore, all of Ind.

[73] Assignee: Parker Hannifin Corporation, Cleveland, Ohio

[21] Appl. No.: 24,946

[22] Filed: Mar. 12, 1987

[51] Int. Cl.$^4$ .............................................. B65D 45/32
[52] U.S. Cl. .................................... 220/320; 220/300; 220/319; 210/234
[58] Field of Search ............... 220/293, 298, 300, 319, 220/320; 210/300, 244, 232, 234

[56] References Cited

U.S. PATENT DOCUMENTS

| | | | |
|---|---|---|---|
| 3,028,896 | 4/1962 | Gooding | 220/300 |
| 3,062,401 | 11/1962 | Needham | 220/320 |
| 3,214,054 | 10/1965 | Poethig et al. | 220/319 |
| 4,102,473 | 7/1978 | Draxler | 220/319 |
| 4,329,919 | 5/1982 | Andersen | 220/300 |
| 4,478,345 | 10/1984 | Edinger | 220/320 |

Primary Examiner—George T. Hall
Attorney, Agent, or Firm—Christopher H. Morgan

[57] ABSTRACT

A safety latch means for a filter assembly or like pressure vessel characterized by a shell member and a removable cover member. Locking means provided on the cover member is adapted to engage with locking means provided on the shell member to secure the cover member to the shell member. Proper engagement between the respective locking means is indicated by alignment of respective external brackets provided on the cover member and shell member. A peripheral locking clamp is provided for retaining the cover and shell members together, the locking clamp being capable of being attached only when the external brackets are aligned.

14 Claims, 5 Drawing Figures

SAFETY LATCH MEANS FOR FILTER ASSEMBLY

BACKGROUND OF THE INVENTION

1. Field of the Invention

The invention relates generally to a safety latch means for securing together respective parts of a pressure vessel housing. More particularly, the invention pertains to a safety latch means for easily and conveniently securing, in a fail-safe manner, the removable cover member to the shell member of a filter assembly.

A filter assembly of the type to which the invention is directed typically and broadly includes a pressure vessel defined by a filter housing having inlet means for the introduction of liquid and/or gas, filter means disposed in the housing for filtering the introduced medium and outlet means for allowing the purified medium to exit from the housing. For purposes of convenience in servicing the assembly, in replacing the filter means, and in gaining access to the interior of the filter assembly, such a housing is typically formed of more than one member, at least one of the members being separable or removable from the remainder of the housing, such as a removable cover member or lid. While this arrangement is highly advantageous for the ease of accessibility which it allows, it does, however, possess certain critical disadvantages.

The provision of a separable member, such as a removable cover member, creates the possibility for potentially violent separation of the cover member from the remainder of the filter housing due to high pressures exerted thereon by the liquid and/or gas introduced into the filter housing. The resulting damage to personnel and equipment associated with an occurrence of this kind presents a serious safety hazard, with potentially grave and costly consequences which severely limit commercial utility and acceptance of the filter assembly. It is thus imperative that the filter assembly include reliable and effective means for securing together the members forming the pressure vessel or filter assembly housing. In the case of a removable cover member, previous attempts have been made to secure the cover member to the remainder of the filter housing by means of a closure clamp. An attendant drawback to utilization of a closure clamp is that there is usually no way to prevent separation of the cover member from the filter housing when the closure clamp fails, or is loosened, prior to venting the pressurized liquid or compressed gas from the housing. The equally great safety hazard posed with this device has similarly resulted in user dissatisfaction and has detracted from its commercial success. Other efforts toward circumventing the possibility of the cover member being blown from the filter housing have generally involved numerous parts and complex assembly, thereby requiring skilled personnel and making them difficult, inconvenient and costly to use.

The present invention addresses and overcomes the foregoing problems and disadvantages by providing a unique safety latch means for reliably and positively securing a removable cover member to the shell member of a filter housing. The safety latch means requires the removable cover member to engage and lock onto pin members provided on the shell member before a locking clamp is able to be attached. Moreover, external brackets formed, respectively, on the cover member and the shell member are required to be aligned before the locking clamp is able to be applied. The safety latch means insures proper engagement of the cover member with the pin members because alignment of the external brackets is not possible unless the cover member is correctly locked in position on the pin members. The safety latch means provides for fail-safe operation of a filter assembly, or other pressure vessel, in that, if the locking clamp fails or is loosened without prior venting of pressure from the filter assembly, the cover member is permitted to move a small amount in relation to the shell member, so as to allow for the venting of pressure, but will not separate or be blown from the shell member.

2. Brief Description of the Prior Art

It is known in the prior art to provide means for securing a removable cover or lid member to a pressure vessel. For example, U.S. Pat. No. 180,365, issued on Jul. 25, 1876 to Myers, discloses a lid having slots formed therein for engagement with pins provided on a body or pressure vessel. Similar types of locking arrangements are shown in U.S. Pat. No. 1,238,013, issued on Aug. 21, 1917 to Harper; U.S. Pat. No. 1,814,572, issued on Jul. 14, 1931 to Shaffer; U.S. Pat. No. 1,948,771, issued on Feb. 27, 1934 to Rucker; and, U.S. Pat. No. 2,185,897, issued on Jan. 2, 1940 to Krause et al.

The prior art also teaches means for securing together respective housing components in a filter assembly. For instance, U.S. Pat. No. 3,321,085, issued on May 23, 1967 to Moorhead, is directed to a water filter comprising upper and lower housing parts having bosses which must be aligned in order for the respective parts to be secured together by means of wing nuts.

U.S. Pat. No. 3,608,726, issued Sept. 28, 1971 to Crowther, teaches a liquid filter wherein a lid member is attached to a body member by means of cooperating lugs and slots.

Finally, U.S. Pat. No. 3,746,171, issued on Jul. 17, 1973 to Thomsen, is directed to a filter assembly wherein interacting cam means provided on the clamping collar and head serve to prevent complete separation of the filter unit in the event of partial loosening of the collar.

The prior art thus fails to teach or suggest a safety latch means, particularly adapted to a filter assembly, which is characterized by locking means for securing a removable cover member to a shell member, external brackets formed, respectively, on the cover and shell members and being adapted for alignment when the locking means is properly engaged, and a locking clamp for securing the cover and shell members together, the locking clamp being adapted to be attached to the filter assembly only when the brackets are correctly aligned and, hence, the locking means properly engaged.

SUMMARY OF THE INVENTION

The invention is directed to safety latch means for a filter assembly or like pressure vessel. The invention is particularly suited for utilization on pressure vessels defined by a housing formed of a shell member and a removable cover member which is adapted to be attached to the shell member and secured thereto by means of a peripheral locking clamp.

According to the present invention, the shell member is formed as a cylindrical body having an upwardly flared flange at its upper open end. The cover member is similarly formed as a cylindrical body, closed at its upper end, and provided with a similar downwardly flared flange at its lower end. The cover member is further provided with an interior depending flange which extends downwardly beyond the downwardly flared flange and which is adapted to fit within the cylindrical body of the shell member such that the downwardly flared flange abuts and is supported by the upwardly flared flange of the shell member, with the flared flanges together forming a peripheral rim.

The shell and cover member assembly is provided with locking means for positively securing the cover member to the shell member. The locking means comprises a plurality of equally spaced pin members provided on and projecting from the interior surface of the shell member. A like plurality of open slots in the shape of inverted L's are formed in the interior depending flange of the cover member. Each of the slots is defined by a vertical leg and a horizontal leg. The slots are located in the interior flange such that the vertical leg of each slot is disposed directly above a pin member when the cover member is brought into alignment over the shell member.

The pin members are adapted to be engaged within the vertical legs of the slots by manually bringing the cover member downwardly toward the shell member and by sliding the interior flange inside the interior surface of the shell member. When the pin members are engaged in the vertical legs of the slots as far as they will go, the cover member is then adapted to be manually rotated so as to cause the pin members to engage and slide within the horizontal legs of the slots. Correct locking position of the cover member with respect to the shell member is achieved when the pin members are fully engaged, as far as possible, in the horizontal legs of the slots.

For purposes of insuring proper engagement of the pin members within the slots, an external bracket is provided on the exterior surface of the cover member and on the exterior surface of the shell member. If the pin members are not fully and completely engaged in their correct position within the slots, the external brackets will not be aligned, but will be offset from each other. When, however, the cover member has been rotated to achieve proper engagement of the pin members within the slots, the external bracket on the cover member will be in alignment with the external bracket on the shell member.

The cover member is adapted to be secured in position with respect to the shell member by means of a two-part peripheral locking clamp. The locking clamp includes two semi-circular locking clamp halves having planar flanges at each of their terminal ends. A hole is provided in each of the flanges. The locking clamp halves are adapted to be assembled around the peripheral rim formed by the abutting flared flanges on the cover and shell members by aligning the flanges, and the holes formed therein, provided on the ends of the locking clamp halves. Bolts are adapted to be passed through the aligned holes formed in the flanges of the locking clamp halves, being secured in position by means of nuts. The nuts may be tightened so as to firmly secure the locking clamp in position.

With the locking clamp so applied, the aligned external brackets are located and project between a pair of aligned flanges of respective locking clamp halves. It is thus apparent that the locking clamp is capable of being applied only when the external brackets are aligned and, hence, only when the pin members are properly and fully engaged within the slots. The external brackets, in conjunction with the locking clamp, thereby prevents possible utilization of the filter assembly in the absence of proper assembly of the parts.

Should the locking clamp become slightly loosened prior to the venting of internal pressure from the filter assembly, the cover member is allowed to move a limited extent, the movement being restricted by the presence of the external brackets between the flanges of the locking clamp halves. This limited freedom of movement permits internal pressure to be vented from the filter assembly while prohibiting separation of the cover member from the shell member. Similarly, should the locking clamp fail or become seriously loosened prior to venting of pressure, the cover member is permitted to move due to the ability of the pin members to slide within the horizontal legs of the slots. The ability of the cover member to move in this manner, while the pin members are still engaged within the horizontal legs, allows pressure to be vented from the filter assembly while the cover member remains attached to the shell member, thereby avoiding potential damage and injury associated with a sudden separation of the cover member and shell member.

DESCRIPTION OF THE PREFERRED EMBODIMENT

Figure 1:
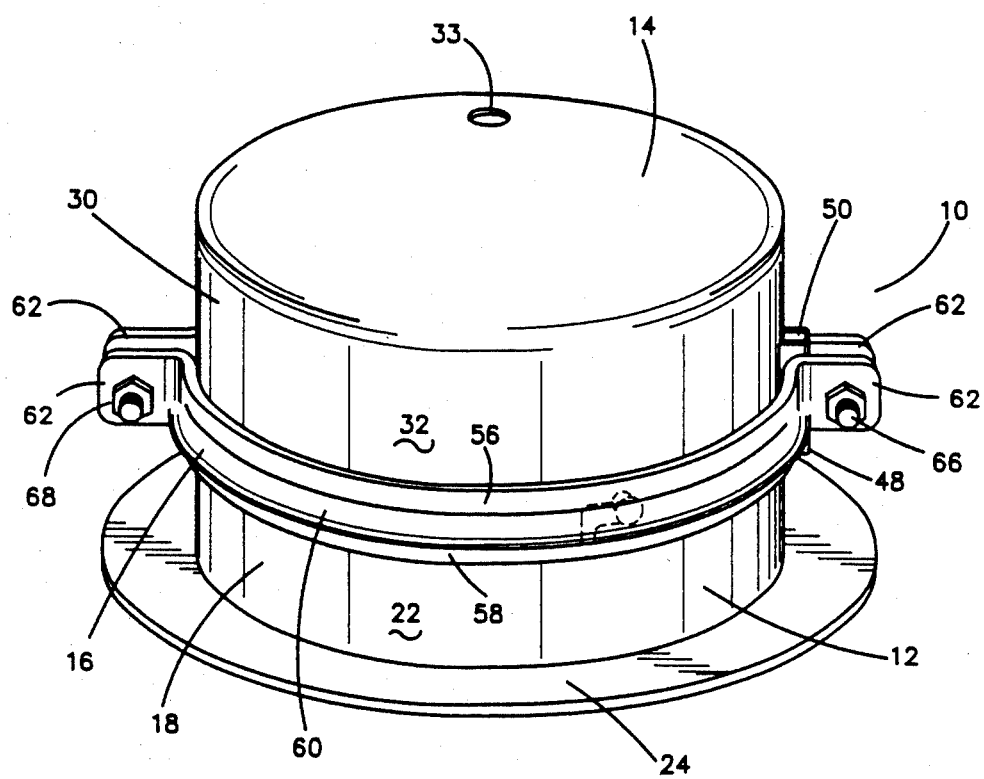
FIG. 1 is a perspective view of an assembled filter assembly of the present invention showing the removable cover member and the shell member as they appear when secured together with the locking means engaged, the brackets aligned and the locking clamp attached.
Figure 2:
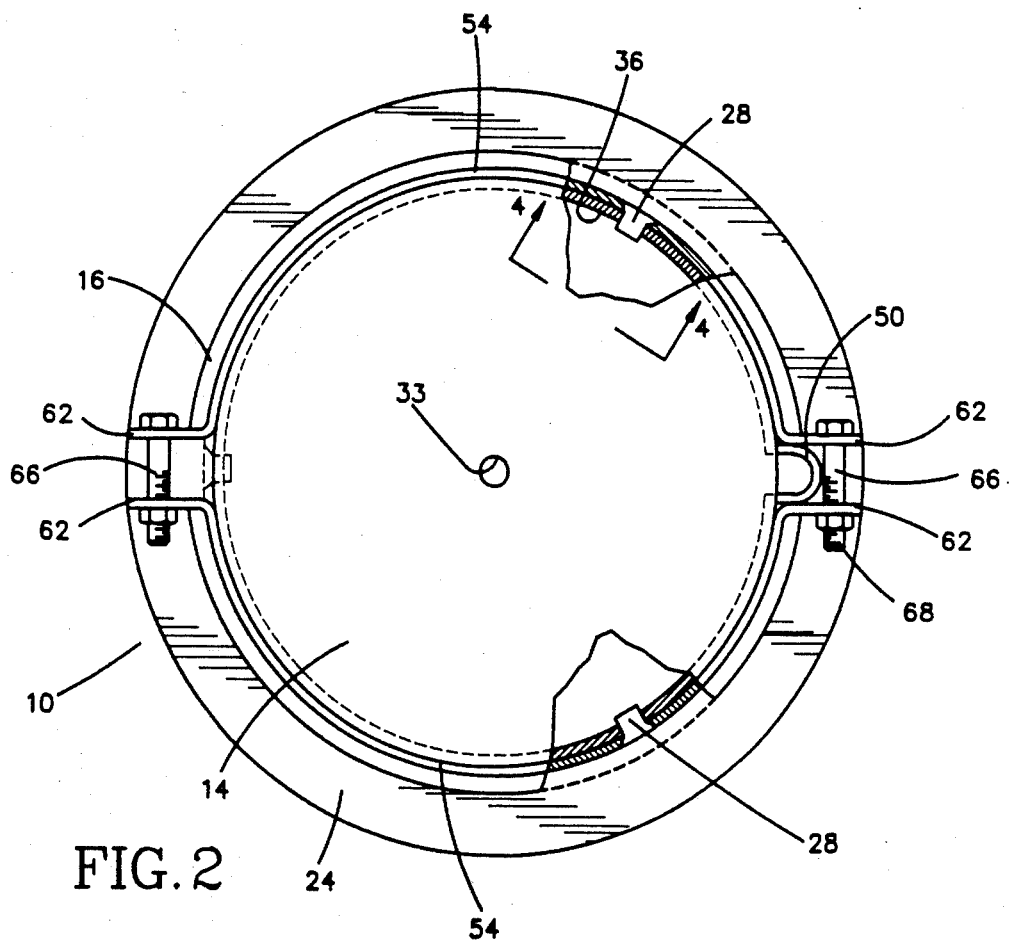
FIG. 2 is a top plan view of the filter assembly of FIG. 1 with the removable cover member partially broken away to show the locking means.
Figure 3:
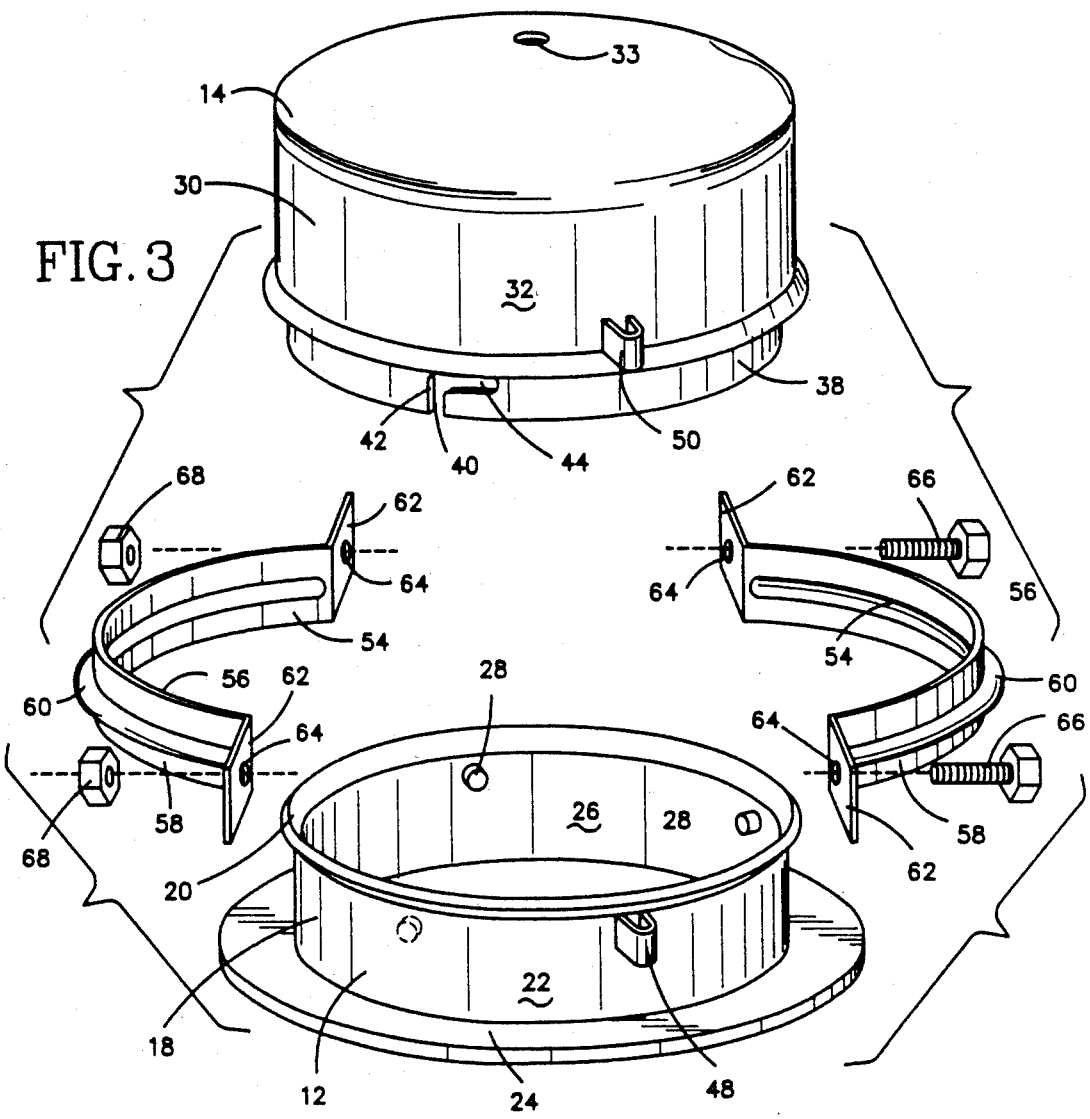
FIG. 3 is a perspective view of the filter assembly as it appears when unassembled.
Figure 4:
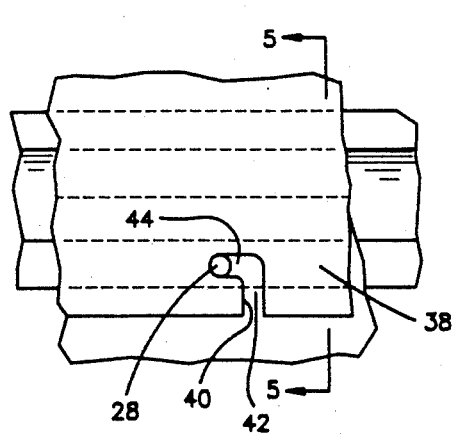
FIG. 4 is a partial sectional view of the assembled filter assembly of FIG. 2 taken along line 4—4 of FIG. 2 and depicting one of the locking means.

With reference to the drawings and, in particular, to FIGS. 1-3, there is shown a filter assembly, indicated generally at 10. The filter assembly 10 comprises a shell member 12 and a removable cover member 14 adapted to be secured together by means of a locking clamp 16 and which, when assembled together as depicted in FIG. 1, define a filter housing or pressure vessel. The filter housing is adapted to receive filter means, such as a filter cartridge, for filtering a liquid or gas introduced into the housing. The filter means, as well as the method and means for introducing the medium to be filtered into the filter housing, do not form part of the present invention. Thus, it should be noted that the safety latch means to be described herein is not limited in application to the particular filter assembly illustrated in the drawings, nor is it limited to filter assemblies per se, in that the present invention is capable of being applied to a wide range of apparatus and circumstances wherein it is essential to provide for a fail-safe safety latch means between respective components of a housing or vessel subject to internal pressures.

The shell member 12, the removable cover 14 and the locking clamp 16 are shown in FIG. 3 in their unassembled condition. As illustrated therein, the shell member 12 comprises a generally cylindrical body 18 which is provided at its open upper end with an upwardly flared peripheral flange 20. The exterior, or outside diameter surface 22 of the shell body is constant throughout, but increases at the flared flange with the diameter of the flared flange being somewhat greater than the outside diameter of the body. The open lower end of the shell member is shown as being provided with a peripheral flange 24, with the lower end of the shell member, as previously noted, not forming a part of the present invention. The interior, or inside diameter surface 26 of the shell member is provided proximate the flared flange 20 with locking means in the form of a plurality of projecting pin members 28, three of which pin members are shown in FIGS. 2 and 3 equally spaced around the interior surface 26 of the shell member. The pin members are adapted to be welded to the interior surface of the shell member at the desired spaced locations.

As illustrated in FIGS. 1 and 3, the cover member 14 is defined by a generally cylindrical body 30, closed at its upper end, and having an outside diameter, or exterior surface 32, equal in diameter to the outside diameter surface 22 of the shell member such that, in the assembled condition shown in FIG. 1, the cover member 14 appears as a vertical extension of the shell member 12. The closed upper end of the body 30 may be provided with a vent hole 33 for purposes of venting trapped gases from the filter assembly. The cover member 14 further includes a flared peripheral flange 34 extending downwardly from the exterior, or outside diameter, surface 32 of the body 30, identical to and of equal diameter to the upwardly flared peripheral flange 20. The interior, or inside diameter, surface 36 of the cover member extends downwardly beyond the downwardly flared flange 34 in a cylindrical, interior vertically depending flange 38. A plurality of open, inverted L-shaped slots 40, having a vertical leg 42 and a horizontal leg 44 and being equal in number to pin members 28, are formed in the interior depending flange 38. The slots 40 are formed in the depending flange such that the vertical legs 42 of the inverted "L"'s forming the slots may be aligned with respect to the shell member so as to directly overlie a pin member 28 on the shell member. Thus, as can be seen in FIGS. 2 and 3, three slots are provided in the depending flange with the vertical leg 42 of each slot corresponding in location to the location of a pin member 28 on shell member 12.

While the outside diameter, or exterior surfaces 32, 22 of the cover member and shell member are congruous and equal, the interior, or inside diameter, surface 36 of the cover member is smaller in diameter than the inside diameter of the interior surface 26 of the shell member, the difference being equal to the thickness of the depending flange 38. Thus, the cylindrical body 30 of the cover member has a greater wall thickness than the wall thickness of the shell member.

The cover member is adapted to be assembled to the shell member, as shown in FIG. 3, by manually aligning the cover member above the shell member with the vertical leg 42 of each of the slots 40 aligned with and disposed directly above a pin member 28. The cover member is then brought down toward the shell member with the interior depending flange 38 being slid downwardly inside of and against the interior surface 26 of the shell member such that each of the pin members 28 is caused to enter the vertical leg 42 of a slot 40. When the pin members are inserted into the vertical legs of the slots as far as they will go, the cover member must then be manually rotated in a clockwise direction to cause the pin members to slide within and engage the horizontal legs 44 of the slots. The pin members are in proper locking engagement within the slots 40 only when they are fully engaged, as far as possible, within the horizontal legs 44 of the slots 40.

Figure 5:
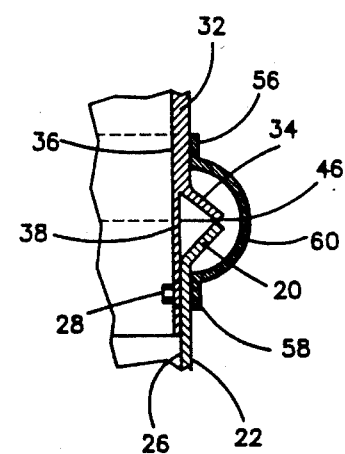
FIG. 5 is a partial vertical sectional view of the assembled filter assembly taken along line 5—5 of FIG. 4 and showing the locking means engaged and the locking clamp attached.

FIG. 5 depicts in cross-section the cover and shell members as they appear when the interior depending flange 38 of the cover member is received within the shell member and the pin member 28 is engaged within the slot 40. In this position, the downwardly flared flange 34 abuts and is supported by the upwardly flared flange 20 so as to form a peripheral rim 46.

In order to preclude the possibility of improper, or only partial, engagement of the pin members 28 within the slots 40, a pair of identical U-shaped external brackets 48, 50 is provided. One U-shaped bracket 48 is provided on the exterior surface 22 of the shell member directly beneath the flared flange 20. The second U-shaped bracket 50 is provided on the exterior surface 32 of the cover member directly above the flared flange 34. The brackets 48 and 50 project outwardly from the exterior surfaces of the shell and cover members an equal distance. The external brackets are located on their respective members such that, when the pin members 28 are engaged in the vertical legs 42 of the slots 40, or are only partly engaged in the horizontal legs 44, the brackets 48 and 50 are not aligned but are offset from each other as illustrated in FIG. 3. When the pin members 28 are in their proper locked positions, fully engaged within the horizontal legs 44 of the slots 40 as a result of clockwise movement of the cover member in relation to the shell member, then, and only then, will the external brackets 48 and 50 be aligned. The brackets 48 and 50 thus provide an accurate, readily ascertainable indication of proper and complete locking engagement of the pin members and the slots.

The cover member is securely retained in proper locked position on the shell member by means of a two-part peripheral locking clamp 16, comprising identical generally semi-circular locking clamp halves 54. Each locking clamp half 54 is defined by an upper planar portion 56 and a lower planar portion 58 which are separated by an integral, outwardly bulging semi-circular portion 60. The terminal ends of each locking clamp half 54 are provided with a planar flange 62 extending outwardly from and generally perpendicular to the respective terminal end. A circular hole 64 is provided in each of the planar flanges 62.

With reference to FIGS. 1, 2 and 3, it can be seen that the locking clamp 16 is adapted to be assembled around the peripheral rim 46 formed by the abutting flared flanges of the cover and shell members. As can be seen in FIG. 5, when assembled therearound, the semi-circular portion 60 of the locking clamp surrounds the rim 46, the upper portion 56 of the locking clamp abuts the exterior surface 32 of the cover member, and the lower portion 58 abuts the exterior surface 22 of the shell member.

The locking clamp is adapted to be assembled around the rim 46 by manually placing the semi-circular portion 60 around the rim and by aligning the holes 64 formed in the planar flanges 62 of respective locking clamp halves 54. Bolts 66 are then passed through each of the holes 64 and are secured by nuts 68. The nuts are tightened as required in order to tightly secure the locking clamp in position.

As depicted in FIGS. 1 and 2, the locking clamp can only be secured around the rim 46 such that the aligned external brackets 48, 50 are located and project between a pair of respective flanges 62 of the locking clamp halves 54. The locking clamp, in the assembled position of the filter assembly, thus serves to positively prohibit rotational movement of the cover member or separation of the cover member from the shell member. Should the locking clamp become slightly loosened prior to venting of pressure from the filter assembly, the cover member will be free to rotate only a small amount, the rotation being limited by the aligned external brackets projecting between the flanges of the locking clamp halves. The degree of rotation will be restricted to the space created between the flanges due to loosening of the locking clamp. This small amount of possible movement allows the cover member to move a sufficient extent so as to vent the internal pressure created in the filter assembly, thereby averting possible injury and damage.

Should the locking clamp fail completely, or become loosened to a greater degree, the cover member will similarly be permitted to rotate by means of the pin members 28 being allowed to move within the horizontal legs 44 of the slots 40. This limited movement occurs while the pin members are still engaged within the horizontal legs of the slots, thereby allowing for the release of internal pressure while still prohibiting separation of the cover member from the shell member.

The locking clamp, in conjunction with the aligned external brackets, serves the additional function of insuring proper locking engagement of the cover member and shell member. Although alignment of the external brackets 48 and 50 provides an effective visual indication of proper engagement of the slots and pin members, the locking clamp actually prohibits possible utilization of the filter assembly in the event of improper application of the cover member to the shell member, in that the locking clamp is capable of being assembled around the rim 46 only when the external brackets are aligned. The locking clamp thus cannot be attached to the filter assembly unless the external brackets are fully aligned. Similarly, alignment of the external brackets is not possible unless the slots formed in the internal depending flange are properly locked onto the pin members provided on the shell member.

It is to be understood that various modifications and changes may be made with respect to the foregoing detailed description without departing from the spirit and scope of the present invention. Thus, the appended claims should be liberally construed, and should not be restricted to their literal terms.

What is claimed is:

1. Safety latch means for a pressure vessel housing comprising a shell member, a separable cover member adapted to be associated with said shell member, and a locking clamp, said shell member being defined by a hollow shell body having an exterior surface, an interior surface and an open upper end, said upper end terminating in an upper peripheral edge, a first external bracket member provided on said exterior surface of said shell body and projecting outwardly therefrom, a plurality of projecting pin members provided on the interior surface of said shell body, said cover member being defined by a hollow cover body having an exterior surface, an interior surface, a closed upper end and an open lower end, said lower end terminating in a lower peripheral edge, an interior depending flange extending downwardly from said interior surface of said cover body beyond said lower peripheral edge, said interior flange being adapted to fit within said shell body when said cover member is associated with said shell member, said lower peripheral edge of said cover body being adapted to abut and be supported by the upper peripheral edge of said shell body when said cover member is associated with said shell member, a second external bracket member provided on said exterior surface of said cover body and projecting outwardly therefrom, a plurality of open slots formed in said interior depending flange, each of said slots being defined by a vertical portion and a horizontal portion, said slots being located on said interior depending flange such that each of said vertical portions is adapted to receive one of said pin members when said cover member is associated with said shell member, said pin members being adapted for engagement within said horizontal portions of said slots when said cover member is associated with said shell member by rotating said cover member with respect to said shell member, said first and second external brackets being adapted to be in alignment when said pin members are fully engaged within said horizontal portions, said locking clamp having at least two terminal ends, said locking clamp being adapted to be assembled around the point of abutment of said lower peripheral edge and said upper peripheral edge by aligning the respective terminal ends, means for securing together said aligned terminal ends of said locking clamp, said aligned external brackets being adapted to be located between said secured terminal ends of said locking clamp, said locking clamp being capable of being assembled around said point of abutment only when said external brackets are aligned.

2. The safety latch means recited in claim 1 wherein said upper peripheral edge is an upwardly flared flange and said lower peripheral edge is a like downwardly flared flange.

3. The safety latch means recited in claim 1 wherein said external brackets are generally U-shaped, said brackets being capable of being aligned only when said pin members are fully engaged within said horizontal portions of said slots, said brackets being offset from each other when said pin members are not fully engaged within said horizontal portions.

4. The safety latch means recited in claim 1 wherein said slots are generally in the shape of an inverted L.

5. The safety latch means recited in claim 2 wherein said downwardly flared flange and said upwardly flared flange together form a peripheral rim when said cover member is associated with said shell member.

6. The safety latch means recited in claim 5 wherein said locking clamp comprises first and second locking clamp halves, said locking clamp halves being adapted to be assembled around said rim.

7. The safety latch means recited in claim 1 wherein said terminal ends of said locking clamp are planar flanges, each of said planar flanges being provided with a hole.

8. The safety latch means recited in claim 7 wherein said means for securing together said terminal ends comprises a bolt adapted to be passed through the aligned holes of said respective flanges, said bolt being adapted to be secured by a nut.

9. Safety latch means for a pressure vessel housing comprising a shell member, a separable cover member adapted to be associated with said shell member, and a locking clamp, said shell member being defined by a hollow generally cylindrical shell body having an exterior surface, an interior surface and an open upper end, said upper end terminating in an upwardly flared peripheral flange, at least one first external bracket member provided on said exterior surface of said shell body proximate said upwardly flared flange and projecting outwardly therefrom, a plurality of projecting pin members provided on the interior surface of said shell body proximate said upper end, said cover member being defined by a hollow generally cylindrical cover body having an exterior surface, an interior surface, a closed upper end and an open lower end, said lower end terminating in a downwardly flared peripheral flange, an interior depending flange extending downwardly from said interior surface of said cover body beyond said downwardly flared flange, said interior depending flange being adapted to be fitted within said shell body when said cover member is associated with said shell member, said downwardly flared flange being adapted to abut and the supported by said upwardly flared flange when said interior depending flange is fitted within said shell body, said downwardly and upwardly flared flanges together forming a peripheral rim when in abutment, at least one second external bracket member provided on said exterior surface of said cover body proximate said downwardly flared flange and projecting outwardly therefrom, a plurality of open slots formed in said interior depending flange, each of said slots being defined by a vertical portion and a horizontal portion, said slots being located such that each of said vertical portions is adapted to receive one of said pin members when said cover member is associated with said shell member, said pin members being adapted for full engagement within said vertical portions when said cover member is associated with said shell member, said pin members being adapted for full engagement within said horizontal portions by manually rotating said cover member with respect to said shell member, said first and second external brackets being adapted to be in alignment only when said pin members are fully engaged within said horizontal portions, said locking clamp including a first clamp half and a second clamp half, said first and second clamp halves each having two terminal ends, said first and second halves being adapted to be assembled around said peripheral rim by aligning said terminal ends of said first clamp half with respective terminal ends of said second clamp half, means for securing together each of said pairs of aligned terminal ends, said aligned external brackets being adapted to be located between the secured terminal ends of one of said pairs of aligned terminal ends, said locking clamp being capable of being assembled around said peripheral rim only when said external brackets are aligned.

10. The safety latch means recited in claim 9 wherein said external brackets are generally U-shaped.

11. The safety latch means recited in claim 9 wherein said slots are generally in the shape of an inverted L.

12. The safety latch means recited in claim 9 wherein said terminal ends of said first and second locking clamp halves are planar flanges, each of said planar flanges being provided with a hole.

13. The safety latch means recited in claim 12 wherein said means for securing together each of said pairs of aligned terminal ends comprises a bolt adapted to be passed through the aligned holes of said flanges, said bolt being adapted to be secured by a nut.

14. The method of using a safety latch means for a pressure vessel housing comprising a shell member, a cover member and a locking clamp, said shell member being defined by an exterior surface, an interior surface and an open upper end, said upper end terminating in an upper peripheral edge, said interior surface of said shell member being provided with a plurality of pin members, said exterior surface of said shell member being provided with a first bracket member, said cover member being defined by an exterior surface, an interior surface and an open lower end, said lower end terminating in a lower peripheral edge, said interior surface of said cover member having an interior depending flange projecting downwardly beyond said lower peripheral edge, said interior flange having a plurality of slots formed therein, each of said slots having a vertical portion and a horizontal portion, said exterior surface of said cover member being provided with a second bracket member, said clamping collar having at least two terminal ends, said terminal ends being terminal planar flanges, each of said terminal planar flanges having a hole formed therein, said holes being adapted to receive the shank of a bolt member, said shank being adapted to receive a nut, wherein said method comprises the steps of:
(a) manually disposing said cover member above said shell member;
(b) aligning said vertical portions of said slots above said pin members;
(c) manually lowering said cover member toward said shell member so as to cause said interior flange of said cover member to enter said open upper end of said shell member and to cause said pin members to become engaged within said vertical portions of said slots;
(d) continuing to lower said cover member so that said pin members are fully engaged within said vertical portions of said slots and said upper and lower peripheral edges are in abutment;
(e) rotating said cover member with respect to said shell member so as to cause said pin members to become engaged within said horizontal portions of said slots and to align said first and second external brackets;
(f) placing said locking clamp around the point of abutment of said upper and lower peripheral edges such that said aligned external brackets are disposed between said terminal flanges of said locking clamp;
(g) aligning said holes in said terminal flanges;
(h) passing said shank of said bolt member through said aligned holes;
(i) applying said nut to said shank; and
(j) tightening said nut.

* * * * *